(12) United States Patent
Kanzaki et al.

(10) Patent No.: US 7,677,577 B2
(45) Date of Patent: Mar. 16, 2010

(54) SEALING DEVICE WITH SOUND INSULATING SEAL

(75) Inventors: Go Kanzaki, Fukushima (JP); Akira Kamichika, Toyota (JP); Fuminori Kataoka, Toyota (JP); Tokuhiro Murakami, Toyota (JP)

(73) Assignee: NOK Corporation (JP)

(*) Notice: Subject to any disclaimer, the term of this patent is extended or adjusted under 35 U.S.C. 154(b) by 323 days.

(21) Appl. No.: 11/793,898

(22) PCT Filed: Oct. 27, 2005

(86) PCT No.: PCT/JP2005/019753

§ 371 (c)(1),
(2), (4) Date: Jun. 21, 2007

(87) PCT Pub. No.: WO2006/067910

PCT Pub. Date: Jun. 29, 2006

(65) Prior Publication Data

US 2008/0203673 A1 Aug. 28, 2008

(30) Foreign Application Priority Data

Dec. 21, 2004 (JP) .............................. 2004-369125

(51) Int. Cl.
*F16J 15/32* (2006.01)
*B62D 1/16* (2006.01)
*F16D 3/84* (2006.01)

(52) U.S. Cl. ...................... 277/551; 277/636; 280/779; 464/170

(58) Field of Classification Search ................. 277/549, 277/551, 634–636; 280/779; 464/170
See application file for complete search history.

(56) References Cited

U.S. PATENT DOCUMENTS

| 4,840,386 A * | 6/1989 | Peitsmeier et al. .......... 277/636 |
| 2005/0250586 A1* | 11/2005 | Yamada et al. .............. 464/170 |
| 2006/0108782 A1* | 5/2006 | Kanazawa et al. .......... 280/779 |

FOREIGN PATENT DOCUMENTS

| JP | 06-084068 U | 2/1994 |
| JP | 09-242880 A | 9/1997 |
| JP | 11-82752 A | 3/1999 |
| JP | 11-351385 A | 12/1999 |
| JP | 2001-280510 A | 10/2001 |

* cited by examiner

OTHER PUBLICATIONS

International Search Report for PCT/JP2005/019753, dated Jan. 18, 2006; ISA/JP (in English).

*Primary Examiner*—Vishal Patel
(74) *Attorney, Agent, or Firm*—Harness, Dickey & Pierce, P.L.C.

(57) ABSTRACT

To improve performance without increasing size, a sealing device comprises a seal body (6) sealing a clearance (5) between the periphery of the shaft hole (3) of a housing (2) and a shaft (4) inserted into the shaft hole (3) and the sound insulating seal (7) insulating sound transmitted through the clearance (5), the seal body (6) comprises a bellows part (10) between a mounting part (8) fitted to the housing (2) and a seal lip part (9) contacting with the shaft (4), the sound insulating seal (7) comprises a sound insulating member (20) disposed at the inner peripheral side of the mounting part (8), and the sound insulating member (20) is held to the seal body (6) in the state of contacting with the mounting part (8) at its outer peripheral part (20a) and with the seal lip part (9) at its inner peripheral part (20b).

3 Claims, 4 Drawing Sheets

SEALING DEVICE WITH SOUND INSULATING SEAL

CROSS-REFERENCE TO RELATED APPLICATIONS

This is a national stage of the International Application No. PCT/JP2005/019753 filed on Oct. 27, 2005 and published in Japanese.

BACKGROUND OF THE INVENTION

1. Field of the Invention

The present invention relates to a sealing device suitably used in a shaft seal part having a large shaft eccentricity or a large mounting eccentricity, for example, a dust seal or the like of a steering shaft in a vehicle such as a motor vehicle or the like, and more particularly to a sealing device with a sound insulating seal having a sound insulating function in addition to a sealing function. The sealing device in accordance with the present invention is used in a general purpose machine or the like in addition to the vehicle mentioned above.

2. Description of the Conventional Art

Conventionally, there has been known a sealing device 51 with a sound insulating seal shown in FIG. 3, and it is structured as follows. The sealing device 51 in FIG. 3 is constituted as a steering dust seal for a vehicle (refer to FIG. 5 described in Japanese Unexamined Patent Publication No. 9-242880, Japanese Unexamined Utility Model Publication No. 6-84068, FIG. 3 in Japanese Unexamined Patent Publication No. 11-82752, Japanese Unexamined Patent Publication No. 11-351385).

First, there is provided a seal body 56 sealing a clearance 55 between a peripheral surface 53a of a shaft hole 53 provided in a front dash panel 52 corresponding to a housing and a steering shaft 54 corresponding to a shaft inserted to the shaft hole 53, and a sound insulating seal 57 insulating a transmitted sound such as an engine sound transmitted to a passenger room inner side B from an engine room side A through the clearance 55, a traveling sound or the like is assembled in the seal body 56.

The seal body 56 has a mounting part 58 mounted to an inner periphery of the shaft hole 53 of the front dash panel 52, and a seal lip part 59 brought into contact with a peripheral surface of the steering shaft 54, and a bellows part 60 for responding to the shaft eccentricity or the like is integrally formed between the mounting part 58 and the seal lip part 59.

Further, the sound insulating seal 57 has a sound insulating member 61 fixed to an inner peripheral side of the mounting part 58 of the seal body 56, and the sound insulating member 61 is formed, for example, in an annular shape by an elastic body.

The sealing device 51 mentioned above is structured such that the sound insulating member 61 of the sound insulating seal 57 arranged at the passenger room inner side B achieves a sound insulating function with respect to the transmitted sound transmitted through the bellows part 60 of the seal body 56 formed in a thin shape by an elastic body, thereby reducing a noise level at the passenger room inner side A, however, the following problems are generated with respect to the sound insulating performance which can be achieved thereby.

The sound insulating member 61 of the sound insulating seal 57 mentioned above is fixed to an inner peripheral side of the mounting part 58 of the seal body 56 in accordance with a fixing means or the like, and a large clearance (a diametrical clearance) 62 is set at a further inner peripheral side thereof, with respect to the steering shaft 54. Accordingly, the transmitted sound through the bellows part 60 mentioned above passes through the clearance 62 (as shown by an arrow C), whereby the achievable sound insulating performance is limited.

In order to solve the problem mentioned above, the applicants of the present application have proposed a sealing device 61 in which two seal bodies 62 each having a mounting part 63, a seal lip part 64 and a bellows part 65 are arranged side by side so as to form a bellows double structure, as shown in FIG. 4. In accordance with the sealing device 61, since the seal lip part 64 of the seal body 62 at a passenger room inner side A is brought into contact with a steering shaft and the clearance in the diametrical direction is not formed at an inner peripheral side thereof, it is possible to increase the sound insulating performance (refer to FIG. 1 in Japanese Unexamined Patent Publication No. 9-242880, FIG. 1 in Japanese Unexamined Patent Publication No. 11-82752).

However, in accordance with this prior art, as a result of the double structure obtained by arranging two seal bodies 62 side by side, a length in an axial direction of the whole of the sealing device 61 (a width of a product) can not help being increased. Accordingly, there is room for further improvement in this point.

SUMMARY OF THE INVENTION

Problem to be Solved by the Invention

The present invention is made by taking the points mentioned above into consideration, and an object of the present invention is to provide a sealing device provided with both of the sealing function and the sound insulating function mentioned above, in which an excellent sound insulating performance can be achieved, and a length in an axial direction of the sealing device is not enlarged.

Means for Solving the Problem

In order to achieve the object mentioned above, in accordance with a first aspect of the present invention, there is provided a sealing device with a sound insulating seal comprising:

a seal body sealing a clearance between a peripheral surface of a shaft hole of a housing and a shaft inserted to the shaft hole; and a sound insulating seal insulating a transmitted sound transmitted through the clearance, the seal body integrally having a bellows part between a mounting part mounted to the housing and a seal lip part brought into contact with the shaft, and the sound insulating seal having a sound insulating member arranged at an inner periphery side of the mounting part, wherein the sound insulating member is arranged at a passenger room inner side of the bellows part, and is structured such as to be held to the seal body in a state of being brought into contact with the mounting part at an outer peripheral part thereof and being always brought into contact with an outer peripheral part of a bumper in the seal lip part at an inner peripheral part thereof.

Further, in accordance with a second aspect of the present invention, there is provided a sealing device with a sound insulating seal as recited in the first aspect mentioned above, wherein the sound insulating member is supported by a lip-shaped sound insulating seal support part provided in the mounting part, is formed in a shape which interferes with the seal lip part, and has a structure such that a part of the sound insulating member is brought into close contact with the seal lip part in a state of being pressed by the seal lip part so as to be concaved.

In the sealing device in accordance with the first aspect of the present invention provided with the structure mentioned above, since the sound insulating member of the sound insulating seal is arranged at the passenger room inner side of the bellows part, and is structured such as to be held to the seal body in the state of being brought into contact with the mounting part of the seal body at the outer peripheral part thereof and being brought into contact with the outer peripheral part of the bumper in the seal lip part of the same seal body at the inner peripheral part thereof, the clearance in the diametrical direction, which allows the transmitted sound to pass therethrough as in the prior art in FIG. 3 mentioned above, is not formed at the inner peripheral side of the sound insulating member. Further, since two bellows are not arranged side by side in the axial direction as in the prior art in FIG. 4 mentioned above, it is possible to prevent the length in the axial direction of the sealing device from being enlarged.

The sound insulating member is formed, for example, in an annular shape by an elastic body, and is attached to the inner peripheral side of the mounting part of the seal body. As for the mounting means, as described in the second aspect, it is preferable to be supported by the lip-shaped sound insulating seal support part provided in the mounting part, be formed in a shape interfering with the seal lip part, and have a structure such that a part of the sound insulating member is pressed by the seal lip part so as to be brought into close contact with the seal lip part in a state of being concaved. When the sound insulating member is partly concaved so as to be brought into contact with the seal lip part as mentioned above, the clearance is hardly generated between both the elements.

EFFECT OF THE INVENTION

The present invention achieves the following effects.

In the sealing device in accordance with the first aspect of the present invention, the sound insulating member is arranged at the passenger room inner side of the bellows part, and is structured such as to be held to the seal body in the state of being brought into contact with the mounting part of the seal body at the outer peripheral part thereof and being always brought into contact with the outer peripheral part of the bumper in the seal lip part at the inner peripheral part thereof as mentioned above, the clearance in the diametrical direction, which allows the transmitted sound to pass therethrough, is not formed at the inner peripheral side of the sound insulating member. Accordingly, since the sound insulating member completely closes the portion between the mounting part and the seal lip part so as to effectively absorb the transmitted sound, it is possible to improve the sound insulating performance.

Further, since two bellows are not arranged side by side in the axial direction, the length in the axial direction of the sealing device is not enlarged.

Further, in the case that the inner peripheral part of the sound insulating member is brought into direct contact with the peripheral surface of the shaft, the sound insulating member is brought into contact with the shaft constituted by a metal member, and there is a risk that an early fatigue such as a permanent deformation, an abrasion or the like is generated in some material of the sound insulating member. However, in the present invention, the sound insulating member is brought into contact with the seal lip part constituted by the elastic body instead of the shaft. Therefore, it is possible to prevent the early fatigue from being generated in the sound insulating member.

Further, in the sealing device in accordance with the second aspect of the present invention, since the sound insulating member is supported by the lip-shaped sound insulating seal support part provided in the mounting part, is formed in the shape which interferes with the seal lip part, and is structured such that a part of the sound insulating member is pressed by the seal lip part so as to be brought into close contact with the seal lip part in a state of being concaved, the clearance is hardly generated between the sound insulating member and the seal lip part. Accordingly, it is possible to improve the sound insulating performance from this point of view.

DETAILED DESCRIPTION OF PREFERRED EMBODIMENT

The present invention includes the following modes.

A sealing device in accordance with the present invention is formed in such a shape as to cover a bellows part by a sound insulating plate (a sound insulating member), or in such a shape as to cover the whole of the bellows part by the sound insulating plate, in order to achieve the object mentioned above. Further, in the case that a sound insulating plate retainer is provided for holding the sound insulating plate, it is possible to improve a sound insulating effect by reducing an inner diameter of the sound insulating plate retainer.

Embodiment

Next, a description will be given of an embodiment in accordance with the present invention with reference to the accompanying drawings.

Figure 1:
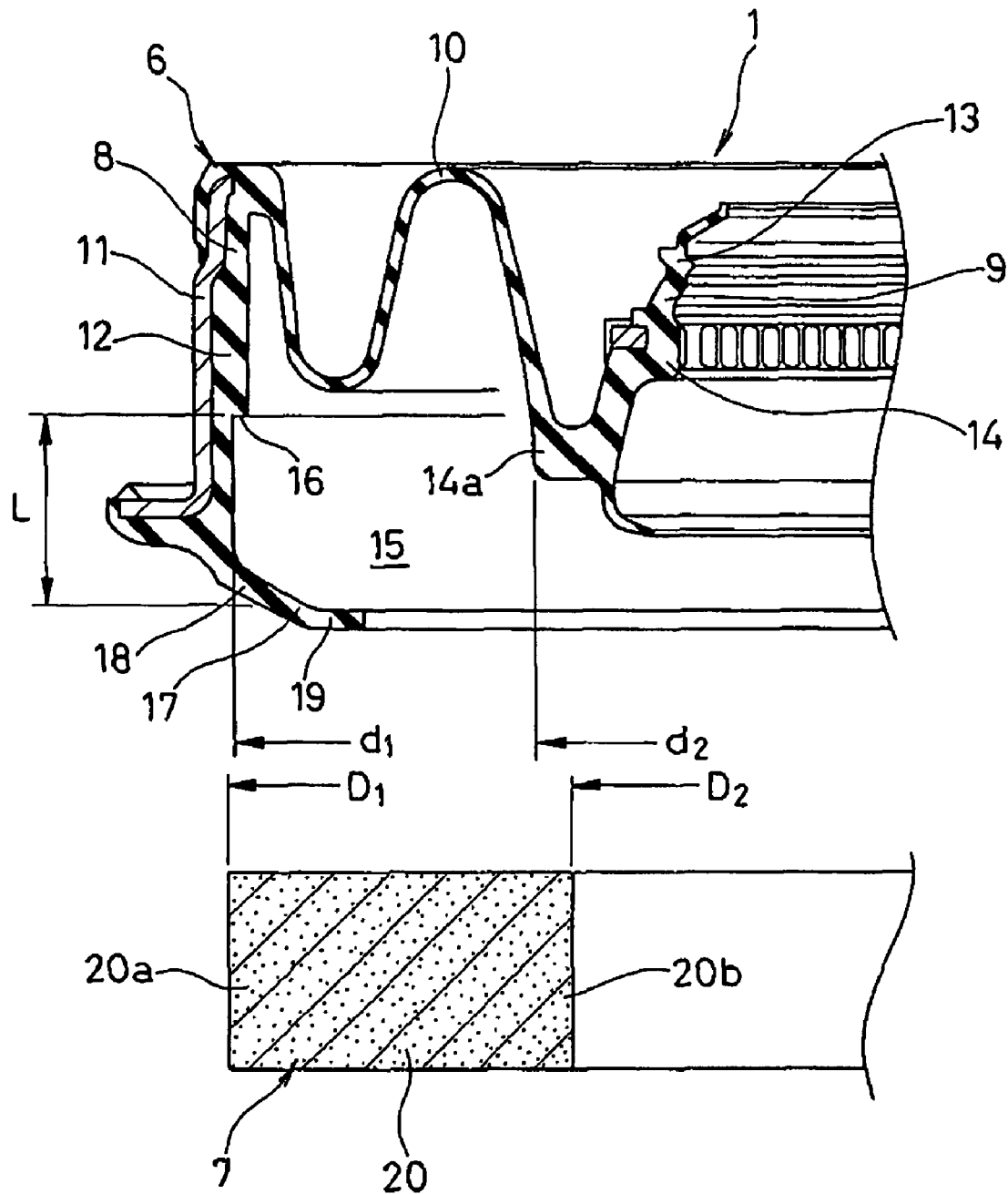
FIG. 1 is a cross sectional view of a main part and shows a state before assembling of a sealing device in accordance with an embodiment of the present invention.
Figure 2:
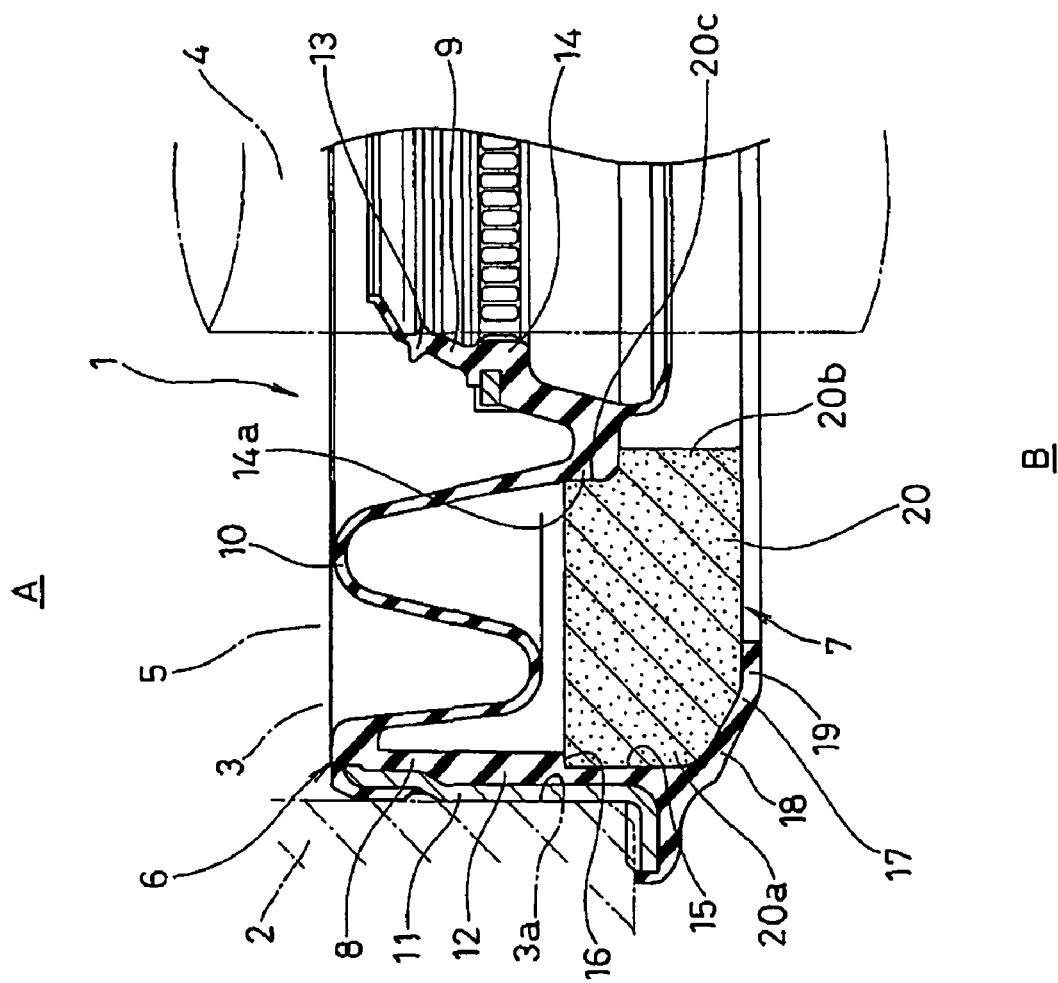
FIG. 2 is a cross sectional view of a main part and shows a state after assembling of the sealing device.

FIG. 1 shows a cross section of a main part in a state before assembling of a sealing device 1 in accordance with the embodiment of the present invention, and in the case that a seal body 6 corresponding to one constituting element is assembled with a sound insulating seal 7 corresponding to the other constituting element, a state shown in FIG. 2 is obtained.

The sealing device 1 in accordance with the embodiment is used as a steering dust seal for a vehicle, and is structured as follows.

As shown in FIG. 1, a seal body 6 is provided for sealing a clearance 5 between a peripheral surface 3a of a shaft hole 3 provided in a front dash panel 2 (refer to FIG. 2) corresponding to a housing, and a steering shaft 4 (refer to FIG. 2) corresponding to a shaft inserted into the shaft hole 3, and a sound insulating seal 7 is assembled with respect to the seal body 6. The sound insulating seal 7 insulates a transmitted sound such as an engine sound, a traveling sound and the like which is transmitted through the clearance 5 from an engine room side A to a passenger room inner side B.

The seal body 6 integrally has a mounting part 8 mounted to an inner periphery of the shaft hole 3 of the front dash panel 2, and a seal lip part 9 brought into contact with a peripheral surface of the steering shaft 4, and a bellows part 10 for responding to a shaft eccentricity or the like is integrally formed between the mounting part 8 and the seal lip part 9.

The mounting part 8 is formed by adhering by vulcanization a rubber-like elastic body 12 onto a surface of a metal ring 11 fitted to an inner periphery of the shaft hole 3 of the front dash panel 2, the bellows part 10 made of the same material is integrally formed at one end part in an axial direction (an upper end part in the drawing) of the rubber-like elastic body 12, and a seal lip part 9 made of the same material is integrally formed at an inner peripheral end part of the bellows part 10. The seal lip part 9 integrally has a dust lip 13 brought into close contact with a peripheral surface of the steering shaft 4, and a bumper 14 for making the dust lip 13 track the shaft eccentricity or the like, and the bellows part 10 is integrally formed with an outer peripheral part 14a of the latter bumper 14 from one side in an axial direction thereof (an upper side in the drawing).

Further, a sound insulating seal holding space 15 having a predetermined width L in an axial direction is provided in an inner peripheral surface of the mounting part 8 in such a manner as to be positioned at the passenger room inner side B of the bellows part 10, and a step-shaped engagement part 16 for positioning the sound insulating seal is provided on an inner peripheral surface of the rubber-like elastic body 12 at one end thereof (an upper end in the drawing). Further, a lip-shaped sound insulating seal support part 17 made of the same material is integrally formed at the other end part in the axial direction (a lower end part in the drawing) of the rubber-like elastic body 12 at the other end (a lower end in the drawing) of the sound insulating seal holding space 15 in such a manner as to be directed to an inner side in a diametrical direction. The lip-shaped sound insulating seal support part 17 integrally has a slant face part 18 extending from the other end part in the axial direction of the rubber-like elastic body 12, and a flat face part 19 extending from a leading end of the slant face part 18 so as to be formed in an annular shape, and is formed in such a shape as to receive the sound insulating seal 7 from the passenger room inner side B. Further, the outer peripheral part 14a of the bumper 14 is positioned at an inner peripheral side of the sound insulating seal holding space 15.

On the other hand, the sound insulating seal 7 has a sound insulating member 20 held in the sound insulating seal holding space 15 provided in the seal body 6, and the sound insulating member 20 is formed in an annular shape by an elastic body, for example, a sponge-like foamed material (for example, Super Seal (registered trademark) manufactured by NHK Spring Co., Ltd.).

Further, the sound insulating member 20 is formed in such a manner that an outer diameter $D_1$ thereof is equal to or slightly larger than a diameter $d_1$ of the sound insulating seal holding space 15 (an inner diameter of the rubber-like elastic body 12 of the mounting part 8 at that part), and an inner diameter $D_2$ is smaller than an outer diameter $d_2$ of the outer peripheral part 14a of the bumper 14 at the seal lip part 9. Accordingly, the sound insulating member 20 is structured such as to be brought into contact with the mounting part 8 by an outer peripheral part 20a thereof, and be brought into contact with the seal lip part 9 by an inner peripheral part 20b thereof, at a time of being assembled. The outer peripheral part 20a is specifically brought into contact with an inner peripheral surface of the rubber-like elastic body 12, and the inner peripheral part 20b is specifically brought into contact with the outer peripheral part 14a of the bumper 14.

Further, as shown in FIG. 1, the sound insulating member 20 is formed in a rectangular cross sectional shape, before being assembled, however, when the sound insulating member 20 is assembled in the seal body 6 as shown in FIG. 2, the sound insulating member 20 is supported by the sound insulating seal support part 17, interferes with the seal lip part 9, and is structured such that a part 20c is pressed by the seal lip part 9 so as to be brought into close contact with the seal lip part 9 in a state of being concaved. An inner peripheral part 20b of the sound insulating member 20 is specifically pressed, and the outer peripheral part 14a of the bumper 14 specifically presses it.

In this case, as shown in FIG. 2, the sound insulating member 20 assembled in the seal body 6 is structured such as to be prevented from being directly brought into contact with the bellows part 10. Further, in the same manner, the sound insulating member 20 is structured such as to be prevented from being directly brought into contact with the peripheral surface of the steering shaft 4.

The sealing device 1 having the structure mentioned above is characterized in that the following operations and effects can be achieved.

Figure 3:
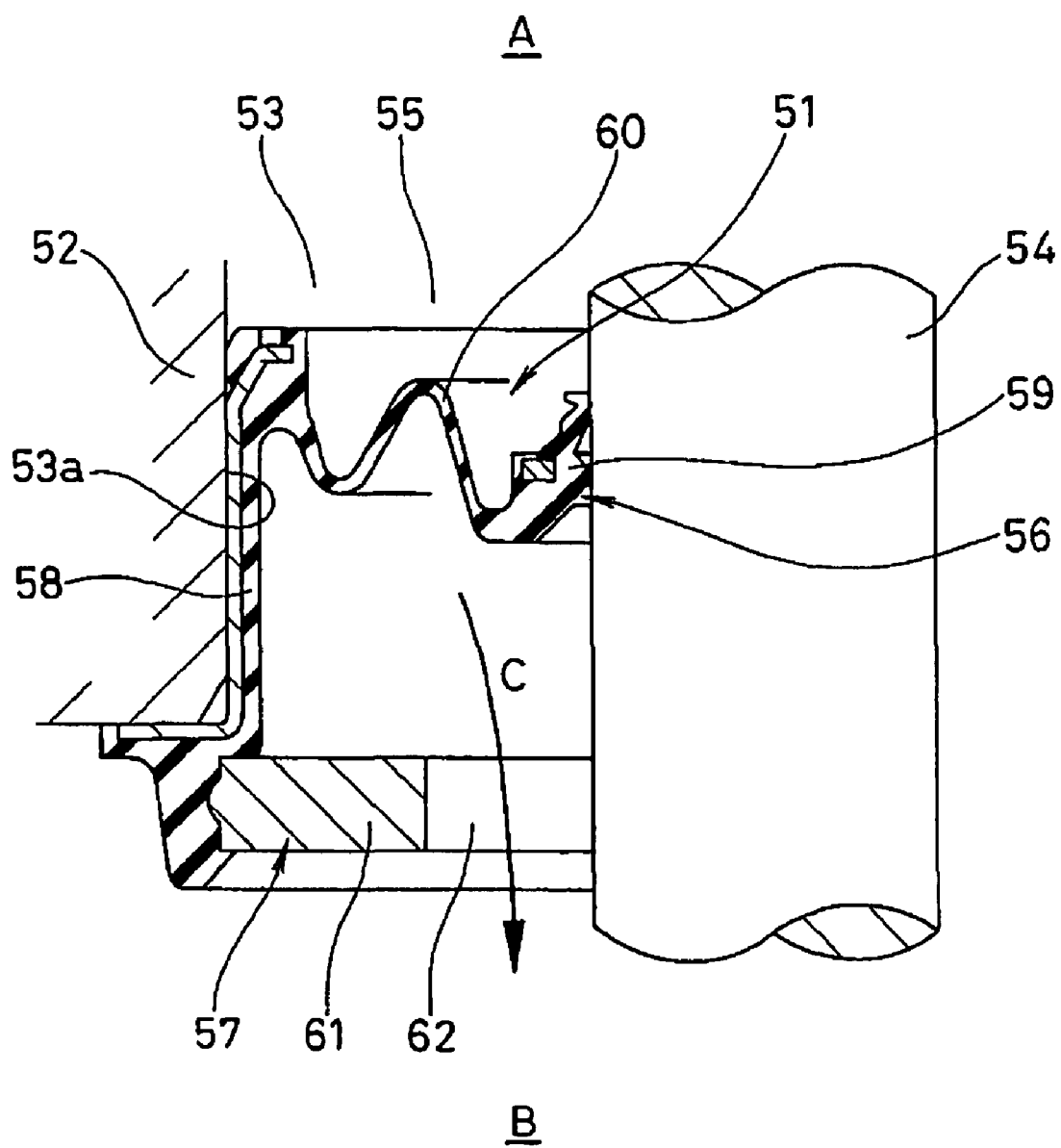
FIG. 3 is a half cut cross sectional view showing an installed state of a sealing device in accordance with a prior art.

First, since the sound insulating member 20 is structured such as to be held by the seal body 6 in the state of being brought into contact with the mounting part 8 at the outer peripheral part 20a thereof, and being brought into contact with the seal lip part 9 at the inner peripheral part 20b thereof as mentioned above, the clearance in the diametrical direction, which allows the transmitted sound to pass therethrough as in the prior art in FIG. 3 mentioned above, is not formed at the inner peripheral side of the sound insulating member 20. Accordingly, since the sound insulating member 20 completely closes the portion between the mounting part 8 and the seal lip part 9 so as to constitute the double structure with respect to the bellows part 10, it is possible to effectively absorb the transmitted sound transmitted through the bellows part 10. Therefore, it is possible to improve the sound insulating performance.

Figure 4:
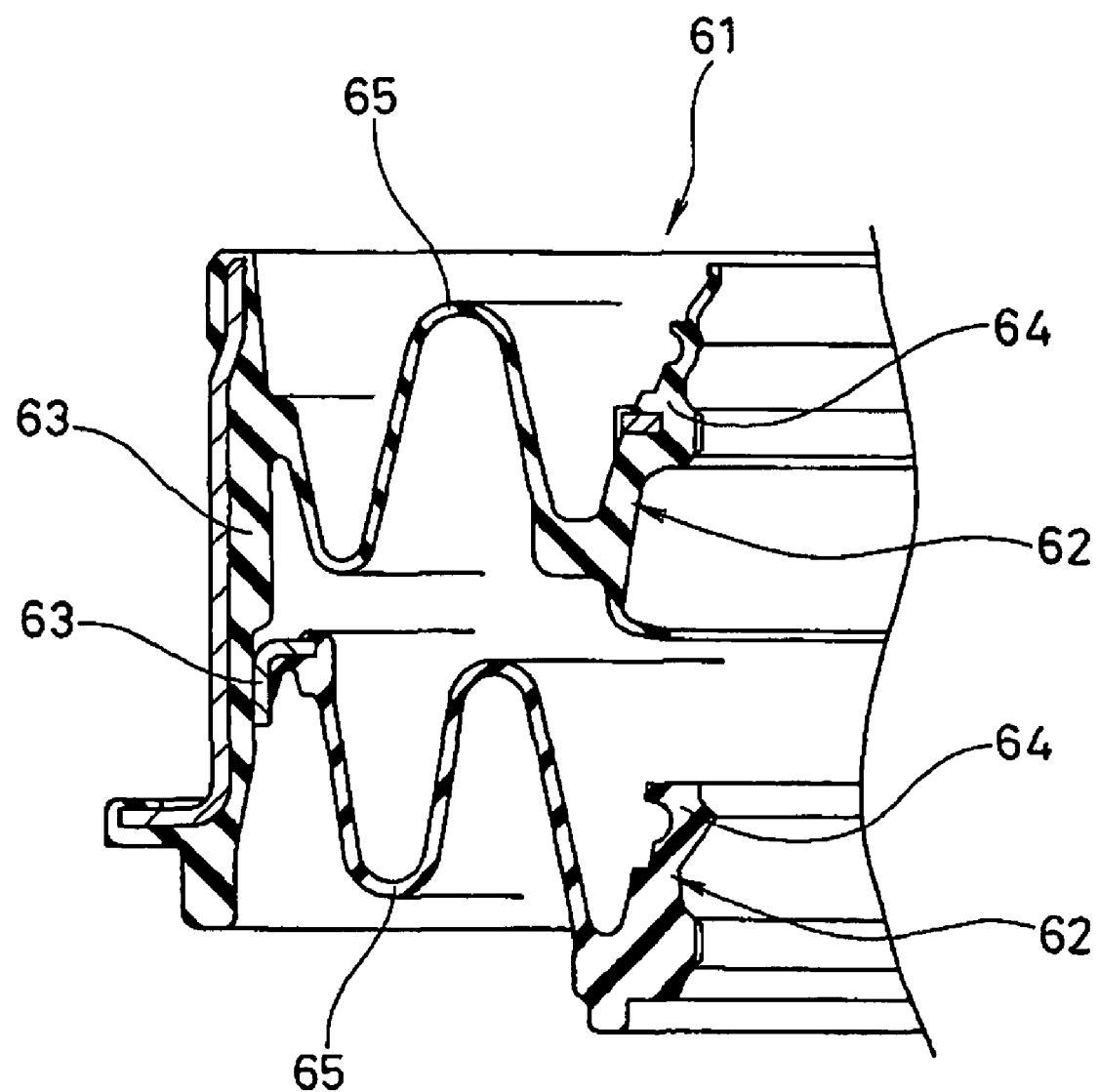
FIG. 4 is a cross sectional view of a main part of a sealing device in accordance with another prior art.

Further, since two bellows are not arranged side by side in the axial direction as in the prior art in FIG. 4 mentioned above, it is possible to prevent enlargement of the length in the axial direction of the sealing device 1, and it is possible to prevent an increase of a torque.

Further, if the inner peripheral part 20b of the sound insulating member 20 is structured such as to be brought into direct contact with the peripheral surface of the steering shaft 4, the sound insulating member 20 is brought into contact with the shaft 4 constituted by a metal member, and there is a risk that an early fatigue such as a permanent deformation, an abrasion or the like is generated in the sound insulating member 20. However, in the structure mentioned above, the sound insulating member 20 is not brought into contact with the shaft 4 made of the metal, but is brought into contact with the seal lip part 9 made of the elastic body. Therefore, it is possible to prevent the early fatigue from being generated in the sound insulating member 20.

Further, since the sound insulating member 20 is supported by the lip-shaped sound insulating seal support part 17 provided in the mounting part 8, interferes with the seal lip part 9, and is structured such that the part 20c is pressed by the seal lip part 9 so as to be brought into close contact with the seal lip part 9 in a state of being concaved, the clearance in the diametrical direction is hardly generated between the sound insulating member 20 and the seal lip part 9. Accordingly, it is possible to improve the sound insulating performance from this point of view.

There is obtained an effect that the sound insulating member 20 supported by the sound insulating seal support part 17 and pressed by the seal lip part 9 is hardly detached from the seal body 6 without any means such as an adhesion or the like.

Further, it is possible to expect the sound insulating effect by the support part 17 by elongating the lip-shaped sound insulating seal support part 17 toward the inner side in the diametrical direction.

What is claimed is:

1. A sealing device with a sound insulating seal comprising:
    a seal body for sealing a clearance between a peripheral surface of a shaft hole of a housing and a shaft inserted into said shaft hole; and
    a sound insulating seal for insulating a sound transmitted through said clearance,
    said seal body integrally having a mounting part mounted on said housing, a seal lip part brought into contact with said shaft, a bellows part for interconnecting said mounting part and said seal lip part, and a lip-shaped sound insulating seal support part extending from a lower end of said mounting part toward an inner peripheral side;
    said mounting part being provided on an inner intermediate portion with a step-shaped engagement part, an outer peripheral part being provided on a bumper that interconnects said bellows part and said seal lip part, a sound insulating seal holding space being defined at a passenger room inner side by an inner peripheral lower portion of said mounting part, said sound insulating seal support part, and said outer peripheral part of said bumper;
    said sound insulating seal having an annular sound absorbing member;
    said annular sound absorbing member being arranged in said sound insulating seal holding space, and being structured such as to be held in said body under a state that an outer peripheral part of said annular sound absorbing member is brought into contact with said inner periphery of said mounting part and said step-shaped engagement part, a part of a bottom surface of said annular sound absorbing member is brought into contact with said sound insulating seal support part, and an upper portion of an inner peripheral part of said annular sound absorbing member is depressed by said outer peripheral part of said bumper so that said upper portion is concave.

2. A sealing device with a sound insulating seal according to claim 1, wherein said annular sound absorbing member is made of a sponge-like foamed material.

3. A sealing device with a sound insulating seal according to claim 1, wherein an inner diameter of said annular sound absorbing member is set to be smaller than an outer diameter of said outer peripheral part of said bumper, and wherein an outer diameter of said annular sound absorbing member is set to be equal to or slightly larger than an inner diameter of said sound insulating seal holding space.

* * * * *